US012323235B2

(12) United States Patent
Ajjannavar et al.

(10) Patent No.: US 12,323,235 B2
(45) Date of Patent: Jun. 3, 2025

(54) IN-BAND SIGNALING FOR INGRESS PTP PACKETS AT A MASTER ENTITY

(71) Applicant: CommScope Technologies LLC, Hickory, NC (US)

(72) Inventors: Santosh Ajjannavar, Belguam (IN); Irfaan Ahamed Salahuddeen, Acton, MA (US); Maunang Contractor, Bangalore (IN)

(73) Assignee: CommScope Technologies LLC, Claremont, NC (US)

( * ) Notice: Subject to any disclaimer, the term of this patent is extended or adjusted under 35 U.S.C. 154(b) by 64 days.

(21) Appl. No.: 18/073,399

(22) Filed: Dec. 1, 2022

(65) Prior Publication Data

US 2023/0179314 A1   Jun. 8, 2023

(30) Foreign Application Priority Data

Dec. 2, 2021   (IN) .............................. 202141055966

(51) Int. Cl.
*H04J 3/06*   (2006.01)
(52) U.S. Cl.
CPC .................................. *H04J 3/0667* (2013.01)
(58) Field of Classification Search
CPC .................................. H04L 5/14; H04J 3/0667
See application file for complete search history.

(56) References Cited

U.S. PATENT DOCUMENTS

| | | | |
|---|---|---|---|
| 10,084,559 B1* | 9/2018 | Devineni | H04J 3/0661 |
| 10,394,734 B1* | 8/2019 | Mallela | G06F 13/32 |
| 11,323,195 B2* | 5/2022 | Ambeskar | G01S 19/256 |
| 11,477,328 B2* | 10/2022 | Liu | H04L 12/1827 |
| 11,709,746 B1* | 7/2023 | Sommers | G06F 11/263 714/33 |
| 11,899,491 B1* | 2/2024 | Sherman | G06F 15/7867 |
| 2007/0025481 A1 | 2/2007 | Ryu et al. | |
| 2013/0272322 A1 | 10/2013 | Sagarwala et al. | |

(Continued)

FOREIGN PATENT DOCUMENTS

| | | |
|---|---|---|
| WO | 2017096557 A1 | 6/2017 |
| WO | 2021108630 A1 | 6/2021 |

OTHER PUBLICATIONS

International Searching Authority, "International Search Report and Written Opinion", from PCT Application No. PCT/US2022/051567, from Foreign Counterpart to U.S. Appl. No. 18/073,399, filed Apr. 14, 2023, pp. 1 through 9, Published: WO.

(Continued)

*Primary Examiner* — Bailor C Hsu
(74) *Attorney, Agent, or Firm* — Fogg & Powers LLC

(57) ABSTRACT

One embodiment is directed to a technique for in-band signaling of time stamp information where a kernel driver executing in kernel space modifies a received timing message (for example, a Precision Time Protocol (PTP) Delay Request message) to include timing information associated with the time the timing message was received by a network interface. This is done so that an application running in the user space can obtain the timing information from the modified timing message and reconstruct a timestamp for the received timing message (for example, a PTP T4 timestamp) for use in implementing at least a part of a packet-based synchronization protocol (for example, the PTP).

20 Claims, 4 Drawing Sheets

(56) References Cited

U.S. PATENT DOCUMENTS

| | | | |
|---|---|---|---|
| 2016/0191632 A1* | 6/2016 | Mirsky | H04L 43/106 |
| | | | 709/224 |
| 2017/0078176 A1* | 3/2017 | Lakshmikantha | H04L 43/0852 |
| 2018/0191802 A1 | 7/2018 | Yang et al. | |
| 2020/0344333 A1* | 10/2020 | Hawari | H04J 3/0667 |
| 2020/0401434 A1* | 12/2020 | Thampi | H04J 3/0667 |
| 2022/0337331 A1* | 10/2022 | Byagowi | H04L 69/28 |

OTHER PUBLICATIONS

IEEE Instrumentation and Measurement Society, "IEEE Standard 1588TM-2008, IEEE Standard for a Precision Clock Synchronization Protocol for Networked Measurement and Control", Jul. 24, 2008, Page(s) Cover through 269.

\* cited by examiner

IN-BAND SIGNALING FOR INGRESS PTP PACKETS AT A MASTER ENTITY

CROSS-REFERENCE TO RELATED APPLICATIONS

This application claims benefit of Indian Provisional Application No. 202141055966 filed on Dec. 2, 2021 and titled "IN-BAND SIGNALING FOR INGRESS PTP PACKETS AT A MASTER ENTITY," the contents of which are hereby incorporated herein in their entirety.

BACKGROUND

The Precision Time Protocol (PTP) is a packet-based two-way synchronization protocol designed to precisely synchronize distributed clocks to sub-microsecond resolution using a packet-based network (such as an Ethernet or Internet Protocol (IP) network). Synchronization of clocks can be achieved in heterogeneous systems that include clocks of different inherent precision, resolution, and stability. The PTP is defined by the Institute of Electrical and Electronics Engineers (IEEE) 1588-2008 standard.

The PTP uses a master-slave architecture where each slave entity synchronizes its local clock to the local clock of a master entity. The master entity can synchronize its local clock to a time reference such as a Global Positioning Signal (GPS) signal. Multiple slave entities can synchronize to the local clock of a single master entity. The master entity and each slave entity exchange synchronization messages that each slave entity uses to correct its local clock. Precise timestamps are captured at the master and slave entities. These timestamps are used to determine the network latency, which is required to synchronize the local clock of each slave entity to the local clock of the master entity.

In some telecommunication systems, the timing requirements for the local clocks of slave entities are more stringent and require very high precision (for example, nanosecond-level accuracy). It is more challenging to achieve this kind of precision in a network where the PTP master entity and multiple PTP slave entities are distributed across an Ethernet network implemented using multiple Ethernet switches, where the Ethernet network is used for many types of network devices, and where many different types of traffic are communicated over the Ethernet network.

One way to achieve the required degree of timing precision is to use a dedicated link between the PTP master entity and each PTP slave entity so that PTP messages can be communicated between the master entity and the slave entity with zero or minimal jitter or latency. This is an ideal scenario but is typically not practical in actual deployments as this approach is costly and telecommunication system operators typically prefer to share network resources.

Another way to achieve the required degree of timing precision is to have the master and slave entities exchange a greater number of synchronization messages (for example, transmitting PTP Sync, Sync Follow Up, Delay Request, and Delay Response messages at rates of 64, 128, 256, or 256 messages per second). With this approach, each slave entity receives more timing messages from the master entity and can implement an intelligent filter to use or discard PTP timing messages based on the jitter or latency experienced by the messages while still having a sufficient number of PTP timing messages to accurately synchronize the local clock of the slave entity to the local clock of the master entity.

This second approach can be implemented entirely in software, requiring no additional hardware resources. However, this second approach significantly increases the processing load of the master entity. This is because the master entity will receive a large number of PTP Delay Request messages from the various salve entities it serves. A respective timestamp reflecting the precise time that each PTP Delay Request message was received at the master entity must be obtained by the PTP application running on the master entity. This timestamp is also referred to as the PTP "T4" timestamp. However, the PTP application typically obtains the T4 timestamp using out-of-band signaling. One example of how out-of-band signaling is used by a PTP application to obtain the T4 timestamp for a received PTP Delay Request message is shown in FIG. 1.

FIG. 1 is a block diagram of a system 100 that is configured to implement a PTP master timing entity (also referred to here as the "master" system 100) for a group of other systems 102 (also referred to here as the "slave" systems 102) that communicate over an Ethernet network 104. The example shown in FIG. 1 is described here as being implemented using the Linux kernel and the memory 106 of the master system 100 can be considered to have a kernel space 108 (a more secure memory space for executing lower-layer software including the operating system kernel and associated drivers) and a user space 110 (a less secure memory space for executing application-layer software).

In this example, an Ethernet driver 112 implemented in the kernel space 108 is configured to receive each PTP Delay Request message and store it in a User Datagram Protocol (UDP) buffer 114. The UDP buffer 114 is used for a socket that is bound to a PTP application 116 executing in the user space 110 in order to receive PTP timing messages.

For each PTP Delay Request message received at the master system 100, the Ethernet driver 112 captures the precise time the PTP Delay Request message was received at the master system 100 (that is, it captures the T4 timestamp) and stores it in a timestamp queue 118 maintained in the kernel space 108. For each received PTP Delay Request message, the PTP application 116 running in the user space 110 of the master system 100 must retrieve the corresponding T4 timestamp from the timestamp queue 118 in the kernel space 108. To do this, the PTP application 116 makes a system call (for example, an input/output control (ioctl) system call) to access the timestamp queue 118 using a PTP kernel driver 120 running in the kernel space 108 and retrieve the T4 timestamp for the associated message. This results in a context switch as the master system 100 switches from user mode (running the PTP application 116 in the user space 110) to kernel mode (running the Ethernet driver 112 and PTP kernel driver 120 in the kernel space 108) and back to user mode (running the PTP application 116 in the user space 110). A context switch is computationally "expensive." But, when out-of-signaling is used by the PTP application 116 to determine the T4 timestamp, a context switch is typically performed for each received PTP Delay Request message, which significantly increases the processing load of the master system 100 when the master and slave systems 100 and 102 exchange a greater number of synchronization messages.

Another issue is that the kernel-space timestamp queue 118 used to store the T4 timestamps may overflow if the PTP application 116 does not dequeue the timestamps sufficiently fast. If the kernel-space timestamp queue 118 used to store the T4 timestamps overflows, the timestamps for some received PTP Delay Request messages will not be able to be stored in the queue 118 and, as a consequence, the PTP application 116 will not be able to obtain the T4 timestamp, which renders the corresponding PTP Delay Request message unusable for PTP processing and can ultimately result in timing instability in the slave systems 102.

SUMMARY

The details of one or more embodiments are set forth in the summary and description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a first system is disclosed. The first system comprises a network interface to communicatively couple the first system to a packet network, and a local clock. The first system further comprises a programmable device coupled to the network interface and the local clock. The programmable device is configured to execute software that is configured to cause the first system to perform tasks for a timing message received by the network interface, the timing message generated by a second system in accordance with a packet-based synchronization protocol and transmitted from the second system over the packet network to the first system. The software configures the first system to, in a kernel space of the first system, capture a timestamp associated with a time a timing message was received by the network interface. The software further configures the first system to, in a kernel space of the first system, modify the timing message to include timing information associated with the time the timing message was received by the network interface thereby producing a modified timing message. The software further configures the first system to, in a user space of the first system, extract the timing information included in the modified timing message for use by the software in implementing at least a part of the packet-based synchronization protocol.

In another embodiment, a method of using in-band signaling to communicate timestamp information to from a kernel space of a first system to a user space of the first system is disclosed. The method is disclosed for a timing message received by a network interface of the first system, the timing message generated by a second system in accordance with a packet-based synchronization protocol and transmitted from the second system over a packet network to the first system. The method comprises, in the kernel space of the first system, capturing a timestamp associated with a time the timing message was received by the network interface. The method further comprises, in the kernel space of the first system, modifying the timing message to include timing information associated with the time the timing message was received by the network interface thereby producing a modified timing message. The method further comprises, in the user space of the first system, extracting the timing information included in the modified timing message for use in implementing at least a part of the packet-based synchronization protocol.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
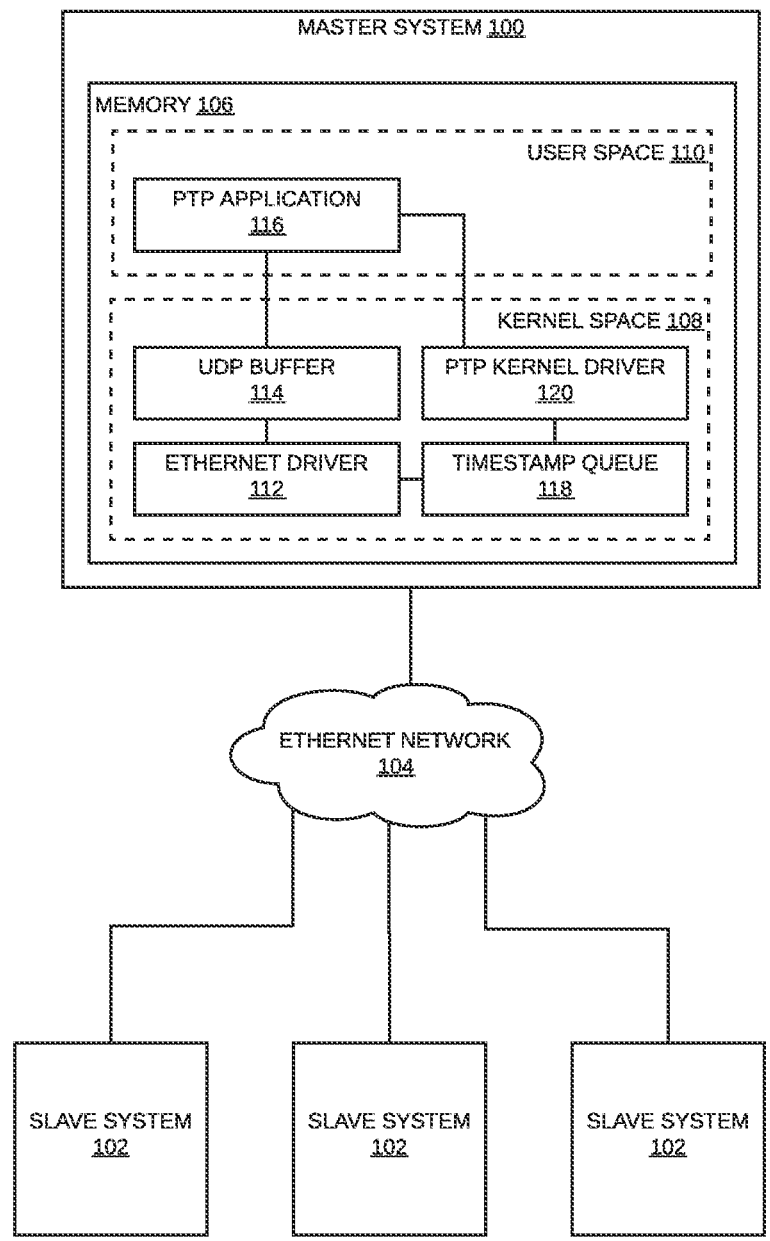
FIG. 1 depicts a block diagram of a system configured to implement a PTP master timing entity.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 2:
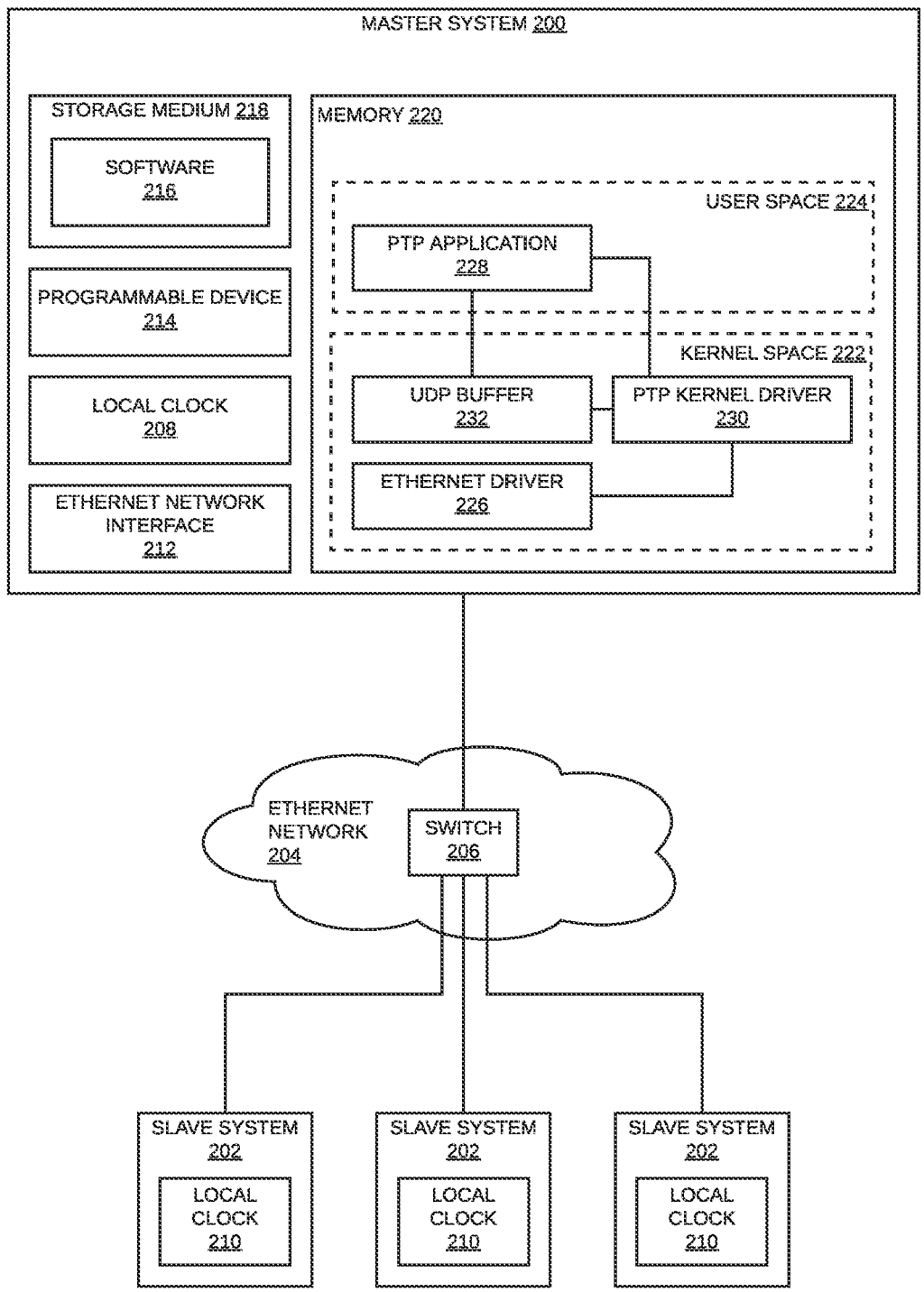
FIG. 2 depicts a block diagram of a system including a master system configured to communicate timestamp information by in-band signaling.

FIG. 2 is a block diagram illustrating one exemplary embodiment of a system 200 in which the improvements to using in-band signaling to communicate timestamp information described here can be used. It is to be understood, however, that the improvements to using in-band signaling to communicate timestamp information described here can be used in other embodiments.

Moreover, the embodiment shown in FIG. 2 is described here as being used with the Precision Time Protocol (PTP) (as defined by the IEEE 1588-2008 standard); however, it is to be understood that other packet-based synchronization protocols can be used (such as, for example, the Network Time Protocol (NTP)).

The system 200 is configured to use a packet-based synchronization protocol (the PTP in this example) to communicate with one or more other end systems 202 over a packet-based network 204. In the exemplary embodiment shown in FIG. 2, the system 200 is configured to serve as a PTP master timing entity to which one or more other end systems 202 can be synchronized using the PTP. These other end systems 202 are configured to serve as PTP slave timing entities.

The system 200 is also referred to here as the "master" system 200, and the other end systems 202 configured to serve as PTP slave entities are also referred to here as "slave" systems 202.

Moreover, in the exemplary embodiment shown in FIG. 2, the packet-based network 204 comprises an Ethernet network (and is also referred to here as the "Ethernet network" 204). The Ethernet network 204 is implemented using one or more Ethernet switches 206. In one implementation of the embodiment shown in FIG. 2, the switches 206 are not configured to be PTP entities and simply forward PTP timing messages between the master system 200 and the slave systems 202 unchanged like other non-PTP Ethernet messages. In another implementation, one or more of the switches 206 is configured as a PTP transparent clock entity and is configured to add a correction factor to at least some of the PTP timing messages it forwards.

The in-band timestamp information signaling techniques described below are described here primarily as being implemented in a PTP master timing entity. It is to be understood, however, that these techniques can be used in nodes or systems configured to implement other PTP timing entities (for example, configured to implement a PTP slave entity).

The master system 200 comprises a local clock 208 that can be synchronized to a time reference such as a Global Positioning Signal (GPS) signal. Each slave system 202 also comprises a respective local clock 210. Each slave system 202 is configured to use the PTP to synchronize its respective local clock 210 to the local clock 208 of the master system 200.

In the embodiment shown in FIG. 2, the master system 200 and the slave systems 202 are configured to use a packet-network based synchronization protocol (the PTP in this example) in which timing messages are exchanged over the packet network 204 (an Ethernet network 204 in this example). The master system 200 includes a network interface 212 to communicatively couple the master system 200 to the packet network 204. In the particular embodiment shown in FIG. 2 where the packet network 204 comprises an Ethernet network, the network interface 212 comprises an Ethernet network interface (and is also referred to here as the "Ethernet network interface" 212).

The master system 200 and slave systems 202, and any of the specific features described here as being implemented thereby, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). The master system 200 and the slave system 202, and any of the specific features described here as being implemented thereby, can be implemented in other ways.

In the exemplary embodiment shown in FIG. 2, the master system 200 comprises at least one programmable device 214 (for example, at least one programmer processor) for executing the software 216. The software 216 comprises program instructions that are stored (or otherwise embodied) on or in an appropriate non-transitory storage medium or media 218 (such as flash or other non-volatile memory, magnetic disc drives, and/or optical disc drives) from which at least a portion of the program instructions are read by the programmable device 214 for execution thereby. Among other things, the software 216 is configured so that, when executed by the programmable device 214, it causes the master system 200 to serve as a master timing entity for the packet-based synchronization protocol (that is, the PTP in this example).

Although the storage media 218 is shown in FIG. 2 as being included in, and local to, the master system 200, it is to be understood that remote storage media (for example, storage media that is accessible over the network 204) and/or removable media can also be used. The master system 200 also includes memory 220 for storing the program instructions (and any related data) during execution by the programmable device 214. Memory 220 comprises, in one implementation, any suitable form of random access memory (RAM) now known or later developed, such as dynamic random access memory (DRAM). In other embodiments, other types of memory are used.

The memory space used by the software 216 executing on the programmable device 214 is logically partitioned into a kernel space 222 (a more secure memory space for executing lower-layer software including operating system kernel and associated drivers) and a user space 224 (a less secure memory space for executing application-layer software). In the following description, for ease of illustration, portions of the software 216 are shown in FIG. 2 within the memory space within the memory 220.

In the exemplary embodiment shown in FIG. 2, the software 216 comprises a network interface kernel driver 226 configured to execute in the kernel space 222. The network interface kernel driver 226 is configured to provide a programming interface to the network interface 212 used to communicatively couple the master system 200 to the packet-based network 204. As noted above, in this exemplary embodiment, the packet-based network 204 comprises an Ethernet network 204, and the network interface 212 comprises an Ethernet network interface 212. Therefore, the network interface kernel driver 226 comprises an Ethernet kernel driver 226.

In the exemplary embodiment shown in FIG. 2, the software 216 further comprises a time synchronization application 228 configured to execute in the user space 224 and a time synchronization kernel driver 230 configured to execute in the kernel space 222. The time synchronization application 228 and time synchronization kernel driver 230 are configured to implement the packet-based synchronization protocol. In this exemplary embodiment where the PTP is used as the packet-based synchronization protocol, the time synchronization application 228 and the time synchronization kernel driver 230 comprise a PTP application 228 and PTP kernel driver 230, respectively, and are configured to implement the PTP. In this exemplary embodiment, the PTP application 228 (with the help of the PTP kernel driver 230) is configured to cause the master system 200 to serve as a PTP master timing entity for the PTP and the slave systems 202 coupled to the network 204.

In the exemplary embodiment shown in FIG. 2, the software 216 is configured so that timestamp information for timing messages received by the system 200 is communicated to the PTP application 228 running in the user space 224 using in-band signaling. One example of how this can be done is described below in connection with FIG. 3.

Figure 3:
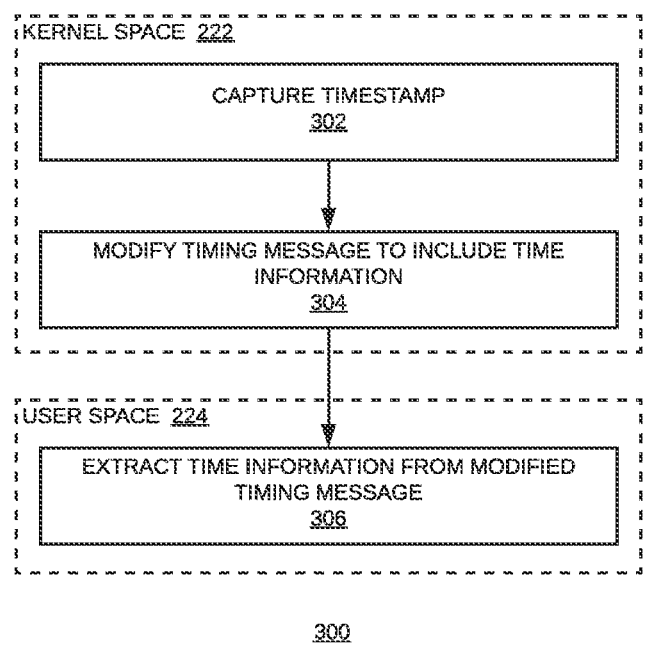
FIG. 3 depicts a flow diagram of a method of using in-band signaling to communicate timestamp information to a time synchronization application running in the user space of a system.

FIG. 3 comprises a high-level flowchart illustrating one exemplary embodiment of a method 300 of using in-band signaling to communicate timestamp information to a time synchronization application running in the user space of a system. The embodiment of method 300 shown in FIG. 3 is described here as being implemented in the system 200 described above in connection with FIG. 2, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

Method 300 comprises, in the kernel space 222, capturing a timestamp associated with a time a timing message was received by the system 200 (block 302). The timing message is generated by a second system 202 in accordance with a packet-based synchronization protocol and transmitted from the second system 202 over the packet network 204 to the first system 200, where it is received by the network interface 212 of the first system 200.

Method 300 further comprises, in the kernel space 222, modifying the timing message to include timing information associated with the time the timing message was received by the first system 200 thereby producing a modified timing message (block 304). Method 300 further comprises, in the user space 224, extracting the timing information included in the modified timing message for use in implementing at least a part of the packet-based synchronization protocol (block 306). More specifically, the timing information included in the modified timing message can be extracted and used to reconstruct the timestamp for the received timing message. The reconstructed timestamp can then be used in performing processing necessary to implement at least a part of the packet-based synchronization protocol.

The exemplary embodiment shown in FIG. 3 is described here as being used with the PTP as the packet-based synchronization protocol, an Ethernet network being used as the packet-based network 204, the first system 200 being configured to serve as a PTP master timing entity, the second system 202 being configured to serve as a PTP slave timing entity, and the timing message being a PTP Delay Request message. However, it is to be understood that this is only one example and the method 300 can be used in other ways (for example, with other PTP messages).

In this exemplary embodiment, a slave system 202 sends a PTP Delay Request message (the timing message) to the master system 200 over the Ethernet network 204. The PTP Delay Request message is received at the Ethernet network interface 212 of the master system 200. The PTP Delay Request message is a UDP message that is received on a UDP port used for PTP event messages. The Ethernet driver 226 captures the timestamp associated with the time the PTP Delay Request message was received by the Ethernet interface 212 of the master system 200. This timestamp is the PTP "T4" timestamp.

In response to the PTP Delay Request message being received by the Ethernet network interface 212 of the master system 200, the PTP kernel driver 230 retrieves the captured T4 timestamp for the received PTP Delay Request message (as well as the received PTP Delay Request message itself) and modifies the PTP Delay Request message to include timing information that can be used to reconstruct the T4 timestamp.

For the PTP, each timestamp comprises a six-byte seconds value representing the number of seconds for the associated reception time and a four-byte nanoseconds value representing the number of nanoseconds for the associated reception time, for a total of ten bytes in a timestamp. Also, each PTP timing message includes a six-byte PTP nanoseconds correction (correctionNs) field and a two-byte PTP sub-nanoseconds correction (correctionSubNs) field in which correction values can be stored. More specifically, a nanoseconds correction value can be stored in the PTP correctionNs field of the PTP timing message and a sub-nanoseconds correction value can be stored in the PTP correctionSubNs field of at least some of the PTP timing message forwarded by switches 206 in the Ethernet network 204 that are configured as PTP transparent clock entities.

In one implementation, the PTP kernel driver 230 modifies the PTP Delay Request message (or any other PTP timing message for which the method 300 is used) to include the timing information by inserting, into the PTP correctionNs field of the received PTP timing message, the four least significant bytes of the six-byte seconds value for the PTP T4 timestamp along with inserting two bytes of the nanoseconds value into the PTP correctionNs field. The PTP correctionSubNs field of the received PTP timing message can then be generated by inserting the remaining two bytes of the nanoseconds value into the PTP correctionSubNs field. For example, the four least significant bytes of the six-byte seconds value for the PTP T4 timestamp are stored as the four most significant bytes of the PTP correctionNs field of the received PTP timing message, and two bytes of the nanoseconds value are stored as the remaining two least significant bytes of the PTP correctionNs field. In this example, the two remaining least significant bytes of the nanoseconds value is inserted into the PTP correctionSubNs field. In another implementation where the switches 206 are configured as PTP transparent clock entities, any values stored in the PTP correctionNs field and/or the PTP correctionSubNs field of the received PTP timing message can be deducted from the nanoseconds value for the PTP T4 timestamp and then the resulting corrected nanoseconds value is inserted into the PTP correctionSubNs field of the received PTP timing message. In this implementation, the four least significant bytes of the six-byte seconds value for the PTP T4 timestamp are inserted into the PTP correctionNs field of the received PTP timing message as in the previous implementation.

After modifying the received PTP Delay Request message (or any other PTP timing message for which the method 300 is used), the PTP kernel driver 230 calculates a new UDP checksum for the modified version of the PTP timing message and further modifies the PTP timing message to include the new UDP checksum. Then, the PTP kernel driver 230 writes the modified PTP timing message into the UDP buffer 232 that is used for the associated socket that the PTP application 228 is bound to for receiving such PTP timing messages.

The PTP application 228 executing in user space 224 receives the modified PTP timing message from the UDP buffer 232 and extracts the timing information included in the modified PTP timing message for use in implementing at least a part of the PTP processing it performs. More specifically, the PTP application 228 uses the timing information included in the modified timing message to reconstruct the PTP timestamp for the received PTP timing message for use in performing processing necessary to implement at least a part of the packet-based synchronization protocol. In one implementation, the PTP application 228 reconstructs the PTP timestamp for the received PTP timing message by obtaining the most significant two bytes from the current value of the local clock 208 of the system 200 and using those two bytes as the two most significant bytes of the seconds value for the timestamp. PTP application 228 also uses the values stored in the PTP correctionNs field of the received PTP timing message as the next six bytes for the timestamp (e.g., the four least significant bytes of the six-byte seconds value and two bytes of the four-byte nanoseconds value stored in the PTP correctionNs field). The remaining two least significant bytes of the modified PTP timestamp are generated using the remaining two-bytes of the four-byte nanoseconds value stored in the PTP correctionSubNs field. However, PTP application 228 can generate the modified PTP timestamp in other ways as well. For example, if only the four least significant bytes of the six-byte seconds value for the timestamp are stored in the PTP correctionNs field, PTP application 228 reconstructs the PTP timestamp using the most significant two bytes from the current value of the local clock 208 along with the four least significant bytes stored in the PTP correctionNs field to reconstruct the six-byte seconds value for the timestamp. In this implementation, the PTP application 228 also reconstructs the four-byte nanoseconds value for the timestamp by using the value stored in the PTP correctionSubNs field of the received PTP timing message as the four bytes of the seconds value for the timestamp.

With embodiments of method 300, timing information associated with the timestamp of a received timing message can be communicated to the time synchronization software executing in user space using an in-band signaling approach where the timing information is inserted into the received message. By doing this, it is possible to avoid the computational cost of performing a context switch by retrieving the timestamp from a timestamp queue in kernel space using a system call as is done with the out-of-band signaling approach described above. Also, with this in-band-signaling approach, there is no chance of overflowing a timestamp queue (which can occur if the out-of-band signaling approach described above is used). This in-band-signaling approach is especially well-suited for use in telecommunication systems where the timing requirements for the local clocks of slave entities are more stringent and require very high precision (for example, nanosecond-level accuracy) and where the required degree of timing precision is achieved by having the master and slave entities exchange a greater number of synchronization messages.

Although the embodiments set forth above are described primarily as being used for communicating the PTP T4 timestamp associated with the receipt of the PTP Delay Request message in a system configured to serve as a PTP master timing entity, it is to be understood that the in-band timestamp information signaling techniques described above can be used to communicate information about other timestamps for other timing messages, in a system configured to serve as another timing entity (for example, as a slave timing entity), and/or with other packet-based synchronization protocols.

Figure 4:
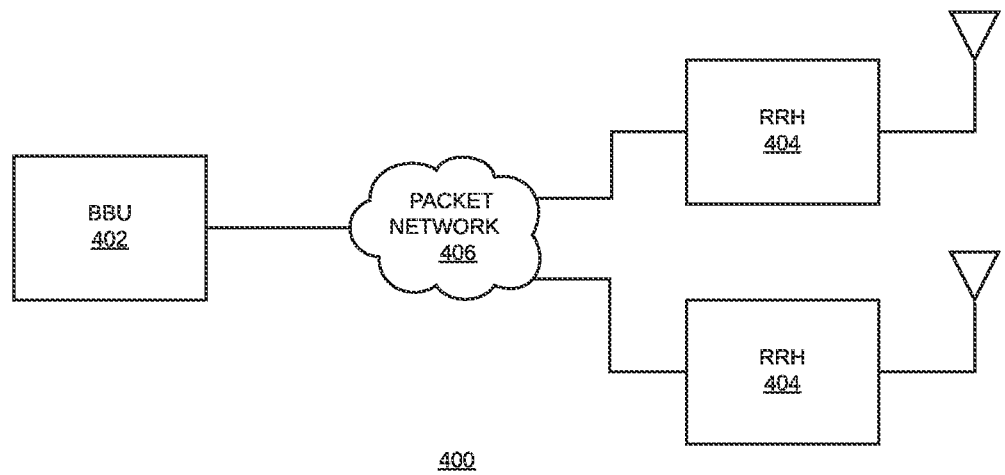
FIG. 4 depicts a block diagram of a radio access network (RAN) configured to synchronize timestamp information between a baseband unit (BBU) and at least one remote radio head (RRH)

The in-band timestamp signaling techniques described here are well suited for use in applications that require high-precision time synchronization. One example of such an application is synchronizing one or more nodes of a radio access network (RAN) used for wirelessly communicating with user equipment using licensed and/or unlicensed radio frequency spectrum. One example of such an application is shown in FIG. 4. In the example shown in FIG. 4, a radio access network (RAN) 400 includes at least one baseband unit (BBU) 402 that is communicatively coupled to one or more remote radio heads (RRH) 404 over a packet-based network 406 (for example, an Ethernet network). In this example, one or more of the BBU 402 and the RRH 404 use a packet-network based synchronization protocol such as the PTP to synchronize their local clocks to a master clock. The master clock can be another node of the RAN (for example, where the master clock is associated with the BBU 402 and one or more of the RRHs 404 synchronize their local clocks to the master clock of the BBU 402) or can be a separate node (for example, where a separate timing master node is used and both the BBU 402 and the RRHs 404 synchronize their local clocks to the master clock of the timing master node). The techniques described above can be used by such nodes to synchronize their local clocks to the master clock.

Figure 5:
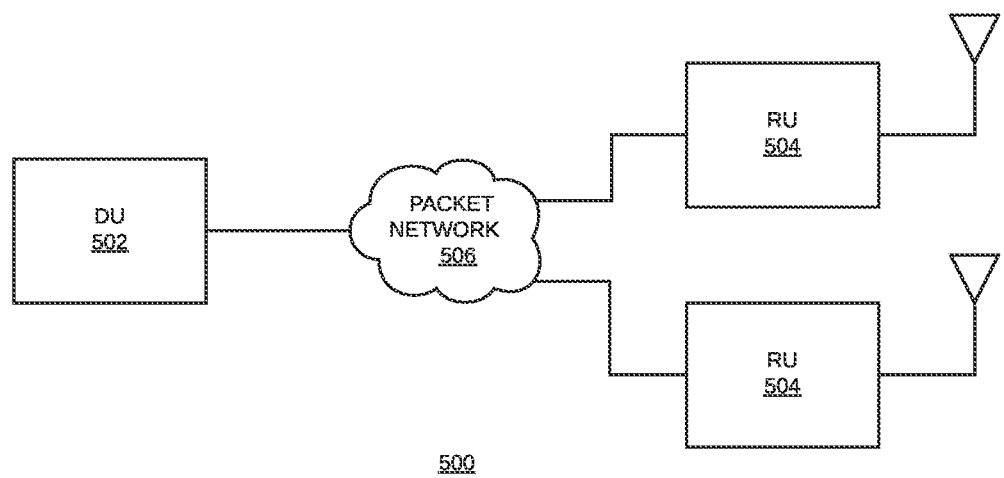
FIG. 5 depicts a block diagram of a radio access network (RAN) configured to synchronize timestamp information between a distributed unit (DU) and at least one radio unit (RU).

Another example of a RAN in which the synchronization techniques described above can be used is shown in FIG. 5. In the example shown in FIG. 5, a radio access network (RAN) 500 is implemented using a RAN architecture and/or RAN interfaces defined by the O-RAN Alliance. ("O-RAN" is an acronym for "Open RAN".) In such an O-RAN example, a O-RAN distributed unit (DU) 502 is communicatively coupled to one or more O-RAN remote units (RUs) 504 over a packet-based network 506 (for example, an Ethernet network). In this example, one or more of the DU 502 and the RUs 504 use a packet-network based synchronization protocol such as the PTP to synchronize their local clocks to a master clock. The master clock can be another node of the RAN (for example, where the master clock is associated with the DU 502 and one or more of the RUs 504 synchronize their local clocks to the master clock of the DU 502) or can be a separate node (for example, where a separate timing master node is used and both the DU 502 and the RUs 504 synchronize their local clocks to the master clock of the timing master node). The techniques described above can be used by such nodes to synchronize their local clocks to the master clock.

The techniques described above can be used in other applications.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electronically erasable programmable read-only memory (EEPROM), and flash memory devices; magnetic disks such as internal hard disks and removable disks; magneto-optical disks; and digital video disks (DVDs). Any of the foregoing may be supplemented by, or incorporated in, specially-designed application-specific integrated circuits (ASICs).

EXAMPLE EMBODIMENTS

Example 1 includes a first system comprising: a network interface to communicatively couple the first system to a packet network; a local clock; and a programmable device coupled to the network interface and the local clock, the programmable device configured to execute software that is configured to cause the first system to do the following for a timing message received by the network interface, the timing message generated by a second system in accordance with a packet-based synchronization protocol and transmitted from the second system over the packet network to the first system: in a kernel space of the first system: capture a timestamp associated with a time a timing message was received by the network interface; and modify the timing message to include timing information associated with the time the timing message was received by the network interface thereby producing a modified timing message; and in a user space of the first system: extract the timing information included in the modified timing message for use by the software in implementing at least a part of the packet-based synchronization protocol.

Example 2 includes the first system of Example 1, wherein the first system is configured to serve as a master timing entity for the packet-based synchronization protocol, and wherein the second system comprises a slave timing entity for the packet-based synchronization protocol.

Example 3 includes the first system of any of Examples 1-2, wherein the first system is configured so that multiple second systems use the first system as a master timing entity for the packet-based synchronization protocol, each of the multiple second systems configured to serve as a respective slave timing entity for the packet-based synchronization protocol; wherein the software is configured to do the following for multiple timing messages received by the network interface from the multiple second systems, each of the multiple timing messages generated by a respective one of the multiple second systems in accordance with the packet-based synchronization protocol and transmitted from the respective second system over the packet network to the first system: in the kernel space of the first system: capture a respective timestamp associated with a respective time each timing message was received by the network interface; and modify each timing message to include respective timing information associated with the respective time each timing message was received by the network interface thereby producing a respective modified timing message; and in the user space of the first system: extract the respective timing information included in each modified timing message for use by the software in implementing at least a part of the packet-based synchronization protocol.

Example 4 includes the first system of any of Examples 1-3, wherein the first system is configured to serve as a slave timing entity for the packet-based synchronization protocol, and wherein the second system comprises a master timing entity for the packet-based synchronization protocol.

Example 5 includes the first system of any of Examples 1-4, wherein the software is configured to reconstruct the timestamp for the timing message from the timing information extracted from the modified timing message thereby producing a reconstructed timestamp for the timing message and use the reconstructed timestamp for the timing message in implementing at least a part of the packet-based synchronization protocol.

Example 6 includes the first system of any of Examples 1-5, wherein the software comprises: a network interface kernel driver configured to execute in the kernel space; a time synchronization application configured to execute in the user space; and a time synchronization kernel driver configured to execute in the kernel space; wherein the network interface kernel driver is configured to capture the timestamp associated with the time the timing message was received by the network interface; wherein the time synchronization kernel driver is configured to modify the timing message to include the timing information associated with the time the timing message was received by the network interface thereby producing the modified timing message; and wherein the time synchronization application is configured to extract the timing information included in the modified timing message for use by the time synchronization application in implementing at least a part of the packet-based synchronization protocol.

Example 7 includes the first system of Example 6, wherein the packet-based synchronization protocol comprises a Precision Time Protocol (PTP); wherein the time synchronization application comprises a PTP time synchronization application; and wherein the time synchronization kernel driver comprises a PTP time synchronization kernel driver.

Example 8 includes the first system of Example 7, wherein the packet network comprises an Ethernet network; wherein the network interface comprises an Ethernet interface; and wherein the network interface kernel driver comprises an Ethernet network interface kernel driver.

Example 9 includes the first system of any of Examples 7-8, wherein the first system is configured to serve as a master timing entity for the packet-based synchronization protocol, and wherein the second system comprises a slave timing entity for the packet-based synchronization protocol; and wherein the timing message comprises a PTP Delay Request message and the timestamp comprises a PTP T4 timestamp for the PTP Delay Request message.

Example 10 includes the first system of any of Examples 7-9, wherein the timestamp comprises: a six-byte seconds value representing a number of seconds associated with the time the timing message was received by the network interface, the six-byte seconds value comprising a two most significant bytes and a four least significant bytes; and a four-byte nanoseconds value representing a number of nanoseconds associated with the time the timing message was received by the network interface; wherein the time synchronization kernel driver is configured to produce the modified timing message by: inserting, into a PTP nanoseconds correction (correctionNs) field of the timing message, the four least significant bytes of the six-byte seconds value and two bytes of the four-byte nanoseconds value of the timestamp; and inserting, into a PTP sub-nanoseconds correction (correctionSubNs) field of the timing message, two other bytes of the four-byte nanoseconds value of the timestamp; and wherein the time synchronization application is configured to: receive the modified timing message; extract, from the PTP correctionNs field of the modified timing message, the four least significant bytes of the six-byte seconds value and the two bytes of the four-byte nanoseconds value of the timestamp; extract, from the PTP correctionSubNs field of the modified timing message, the two other bytes of the four-byte nanoseconds value of the timestamp; obtain the two most significant bytes for the six-byte seconds value from a local clock; reconstruct the timestamp for the timing message from the two most significant bytes for the six-byte seconds value obtained from the local clock, the extracted four least significant bytes of the six-byte seconds value of the modified timing message, and the extracted four-byte nanoseconds value of the modified timing message thereby producing a reconstructed timestamp for the timing message; and use the reconstructed timestamp for the timing message in implementing at least part of the packet-based synchronization protocol.

Example 11 includes the first system of any of Examples 7-10, wherein the timestamp comprises: a six-byte seconds value representing a number of seconds associated with the time the timing message was received by the network interface, the six-byte seconds value comprising a two most significant bytes and a four least significant bytes; and a four-byte nanoseconds value representing a number of nanoseconds associated with the time the timing message was received by the network interface; wherein the time synchronization kernel driver is configured to produce the modified timing message by: using any nanosecond correction value stored in a PTP nanoseconds correction (correctionNs) field of the timing message and any sub-nanoseconds correction value stored in a PTP sub-nanoseconds correction (correctionSubNs) field of the timing message to correct the nanoseconds values of the timestamp thereby producing a corrected nanoseconds value for the timestamp; inserting, into the PTP correctionNs field of the timing message, the four least significant bytes of the six-byte seconds value and two bytes of the four-byte nanoseconds value of the timestamp; and inserting, into the PTP correctionSubNs field of the timing message, the corrected nanoseconds values for the timestamp; and wherein the time synchronization application is configured to: receive the modified timing message; extract, from the PTP correctionNs field of the modified timing message, the four least significant bytes of the six-byte seconds value of the timestamp and the two bytes of the four-byte nanoseconds value; extract, from the PTP correctionSubNs field of the modified timing message, the corrected nanoseconds value for the timestamp; obtain the two most significant bytes for the six-byte seconds value from a local clock; reconstruct the timestamp for the timing message from the two most significant bytes for the six-byte seconds value obtained from the local clock, the four least significant bytes of the six-byte seconds value and the two bytes of the four-byte nanoseconds value of the timestamp extracted from the PTP correctionNs field of the modified timing message, and the corrected nanoseconds value for the timestamp extracted from the PTP correctionSubNs field of the modified timing message thereby producing a reconstructed timestamp for the timing message; and use the reconstructed timestamp for the timing message in implementing at least part of the packet-based synchronization protocol.

Example 12 includes the first system of any of Examples 1-11, wherein the first system comprises a node of a radio access network.

Example 13 includes the first system of any of Examples 1-12, wherein the first system comprises a first baseband unit (BBU) and the second system comprises at least one of a second BBU and a remote radio head (RRH).

Example 14 includes the first system of any of Examples 1-13, wherein the first system comprises a first O-RAN distributed unit (DU) and the second system comprises at least one of a second O-RAN DU and an O-RAN remote unit (RU).

Example 15 includes a method of using in-band signaling to communicate timestamp information to from a kernel space of a first system to a user space of the first system, the method comprising, for a timing message received by a network interface of the first system, the timing message generated by a second system in accordance with a packet-based synchronization protocol and transmitted from the second system over a packet network to the first system: in the kernel space of the first system: capturing a timestamp associated with a time the timing message was received by the network interface; and modifying the timing message to include timing information associated with the time the timing message was received by the network interface thereby producing a modified timing message; and in the user space of the first system: extracting the timing information included in the modified timing message for use in implementing at least a part of the packet-based synchronization protocol.

Example 16 includes the method of Example 15, wherein the first system is configured to serve as a master timing entity for the packet-based synchronization protocol, and wherein the second system comprises a slave timing entity for the packet-based synchronization protocol.

Example 17 includes the method of any of Examples 15-16, wherein the first system is configured so that multiple second systems use the first system as a master timing entity for the packet-based synchronization protocol, each of the multiple second systems configured to serve as a respective slave timing entity for the packet-based synchronization protocol; wherein the method is performed for timing messages received by the network interface from the multiple second systems, each timing message generated by a respective one of the multiple second systems in accordance with the packet-based synchronization protocol and transmitted from the respective second system over the packet network to the first system.

Example 18 includes the method of any of Examples 15-17, wherein the first system is configured to serve as a slave timing entity for the packet-based synchronization protocol, and wherein the second system comprises a master timing entity for the packet-based synchronization protocol.

Example 19 includes the method of any of Examples 15-18, further comprising reconstructing the timestamp for the timing message from the timing information extracted from the modified timing message to produce a reconstructed timestamp for the timing message and using the reconstructed timestamp for the timing message in implementing at least a part of the packet-based synchronization protocol.

Example 20 includes the method of any of Examples 15-19, wherein the packet-based synchronization protocol comprises a Precision Time Protocol (PTP).

Example 21 includes the method of Example 20, wherein the timestamp comprises: a six-byte seconds value representing a number of seconds associated with the time the timing message was received by the network interface, the six-byte seconds value comprising a two most significant bytes and a four least significant bytes; and a four-byte nanoseconds value representing a number of nanoseconds associated with the time the timing message was received by the network interface; wherein modifying the timing message to include the timing information associated with the time the timing message was received by the network interface thereby producing the modified timing message comprises: inserting, into a PTP nanoseconds correction (correctionNs) field of the timing message, the four least significant bytes of the six-byte seconds value and two bytes of the four-byte nanosecond value of the timestamp; and inserting, into a PTP sub-nanoseconds correction (correctionSubNs) field of the timing message, two other bytes of the four-byte nanoseconds value of the timestamp; and wherein extracting the timing information included in the modified timing message for use in implementing at least a part of the packet-based synchronization protocol comprises: receiving the modified timing message; extracting, from the PTP correctionNs field of the modified timing message, the four least significant bytes of the six-byte seconds value and the two bytes of the four-byte nanosecond value of the timestamp; extracting, from the PTP correctionSubNs field of the modified timing message, the two other bytes of the four-byte nanoseconds value of the timestamp; obtaining the two most significant bytes for the six-byte seconds value from a local clock; reconstructing the timestamp for the timing message from the two most significant bytes for the six-byte seconds value obtained from the local clock, the extracted four least significant bytes of the six-byte seconds value of the modified timing message, and the extracted four-byte nanoseconds value of the modified timing message thereby producing a reconstructed timestamp for the timing message; and using the reconstructed timestamp for the timing message in implementing at least part of the packet-based synchronization protocol.

Example 22 includes the method of any of Examples 20-21, wherein the timestamp comprises: a six-byte seconds value representing a number of seconds associated with the time the timing message was received by the network interface, the six-byte seconds value comprising a two most significant bytes and a four least significant bytes; and a four-byte nanoseconds value representing a number of nanoseconds associated with the time the timing message was received by the network interface; wherein modifying the timing message to include the timing information associated with the time the timing message was received by the network interface thereby producing the modified timing message comprises: using any nanosecond correction value stored in a PTP nanoseconds correction (correctionNs) field of the timing message and any sub-nanoseconds correction value stored in a PTP sub-nanoseconds correction (correctionSubNs) field of the timing message to correct the nanoseconds values of the timestamp thereby producing a corrected nanoseconds value for the timestamp; inserting, into the PTP correctionNs field of the timing message, the four least significant bytes of the six-byte seconds value and two bytes of the four-byte nanoseconds value of the timestamp; and inserting, into the PTP correctionSubNs field of the timing message, the corrected nanoseconds values for the timestamp; and wherein extracting the timing information included in the modified timing message for use in implementing at least a part of the packet-based synchronization protocol comprises: receiving the modified timing message; extracting, from the PTP correctionNs field of the modified timing message, the four least significant bytes of the six-byte seconds value and the two bytes of the four-byte nanoseconds value of the timestamp; extracting, from the PTP correctionSubNs field of the modified timing message, the corrected nanoseconds value for the timestamp; obtaining the two most significant bytes for the six-byte seconds value from a local clock; reconstructing the timestamp for the timing message from the two most significant bytes for the six-byte seconds value obtained from the local clock, the four least significant bytes of the six-byte seconds value and the two bytes of the four-byte nanoseconds value of the timestamp extracted from the PTP correctionNs field of the modified timing message, and the corrected nanoseconds value for the timestamp extracted from the PTP correctionSubNs field of the modified timing message thereby producing a reconstructed timestamp for the timing message; and using the reconstructed timestamp for the timing message in implementing at least part of the packet-based synchronization protocol.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A first system comprising:
a network interface to communicatively couple the first system to a packet network;
memory;
a local clock; and
a programmable device coupled to the network interface, the memory, and the local clock, the programmable device configured to execute software that is configured to logically partition a memory space in the memory into a kernel space and a user space and to cause the first system to do the following for a timing message received by the network interface, the timing message generated by a second system in accordance with a packet-based synchronization protocol and transmitted from the second system over the packet network to the first system:
in the kernel space of the memory space:
capture a timestamp associated with a time a timing message was received by the network interface; and
modify the timing message to include timing information associated with the time the timing message was received by the network interface thereby producing a modified timing message; and
in the user space of the memory space:
access the modified timing message; and
extract the timing information included in the modified timing message for use by the software in implementing at least a part of the packet-based synchronization protocol.

2. The first system of claim 1, wherein the first system is configured to serve as a master timing entity for the packet-based synchronization protocol, and wherein the second system comprises a slave timing entity for the packet-based synchronization protocol.

3. The first system of claim 1, wherein the first system is configured so that multiple second systems use the first system as a master timing entity for the packet-based synchronization protocol, each of the multiple second systems configured to serve as a respective slave timing entity for the packet-based synchronization protocol;
wherein the software is configured to do the following for multiple timing messages received by the network interface from the multiple second systems, each of the multiple timing messages generated by a respective one of the multiple second systems in accordance with the packet-based synchronization protocol and transmitted from the respective second system over the packet network to the first system:
in the kernel space of the memory space:
capture a respective timestamp associated with a respective time each timing message was received by the network interface; and
modify each timing message to include respective timing information associated with the respective time each timing message was received by the network interface thereby producing a respective modified timing message; and in the user space of the memory space:

extract the respective timing information included in each modified timing message for use by the software in implementing at least a part of the packet-based synchronization protocol.

4. The first system of claim 1, wherein the software is configured to reconstruct the timestamp for the timing message from the timing information extracted from the modified timing message thereby producing a reconstructed timestamp for the timing message and use the reconstructed timestamp for the timing message in implementing at least a part of the packet-based synchronization protocol.

5. The first system of claim 1, wherein the software comprises:

a network interface kernel driver configured to execute in the kernel space;

a time synchronization application configured to execute in the user space; and a time synchronization kernel driver configured to execute in the kernel space;

wherein the network interface kernel driver is configured to capture the timestamp associated with the time the timing message was received by the network interface;

wherein the time synchronization kernel driver is configured to modify the timing message to include the timing information associated with the time the timing message was received by the network interface thereby producing the modified timing message; and wherein the time synchronization application is configured to extract the timing information included in the modified timing message for use by the time synchronization application in implementing at least a part of the packet-based synchronization protocol.

6. The first system of claim 5, wherein the packet-based synchronization protocol comprises a Precision Time Protocol (PTP);

wherein the time synchronization application comprises a PTP time synchronization application; and wherein the time synchronization kernel driver comprises a PTP time synchronization kernel driver.

7. The first system of claim 6, wherein the packet network comprises an Ethernet network;

wherein the network interface comprises an Ethernet interface; and wherein the network interface kernel driver comprises an Ethernet network interface kernel driver.

8. The first system of claim 6, wherein the first system is configured to serve as a master timing entity for the packet-based synchronization protocol, and wherein the second system comprises a slave timing entity for the packet-based synchronization protocol; and wherein the timing message comprises a PTP Delay Request message and the timestamp comprises a PTP T4 timestamp for the PTP Delay Request message.

9. The first system of claim 6, wherein the timestamp comprises:

a six-byte seconds value representing a number of seconds associated with the time the timing message was received by the network interface, the six-byte seconds value comprising a two most significant bytes and a four least significant bytes; and a four-byte nanoseconds value representing a number of nanoseconds associated with the time the timing message was received by the network interface;

wherein the time synchronization kernel driver is configured to produce the modified timing message by:

inserting, into a PTP nanoseconds correction (correctionNs) field of the timing message, the four least significant bytes of the six-byte seconds value and two bytes of the four-byte nanoseconds value of the timestamp; and inserting, into a PTP sub-nanoseconds correction (correctionSubNs) field of the timing message, two other bytes of the four-byte nanoseconds value of the timestamp; and wherein the time synchronization application is configured to:

receive the modified timing message;

extract, from the PTP correctionNs field of the modified timing message, the four least significant bytes of the six-byte seconds value and the two bytes of the four-byte nanoseconds value of the timestamp;

extract, from the PTP correctionSubNs field of the modified timing message, the two other bytes of the four-byte nanoseconds value of the timestamp;

obtain the two most significant bytes for the six-byte seconds value from a local clock;

reconstruct the timestamp for the timing message from the two most significant bytes for the six-byte seconds value obtained from the local clock, the extracted four least significant bytes of the six-byte seconds value of the modified timing message, and the extracted four-byte nanoseconds value of the modified timing message thereby producing a reconstructed timestamp for the timing message; and use the reconstructed timestamp for the timing message in implementing at least part of the packet-based synchronization protocol.

10. The first system of claim 6, wherein the timestamp comprises:

a six-byte seconds value representing a number of seconds associated with the time the timing message was received by the network interface, the six-byte seconds value comprising a two most significant bytes and a four least significant bytes; and a four-byte nanoseconds value representing a number of nanoseconds associated with the time the timing message was received by the network interface;

wherein the time synchronization kernel driver is configured to produce the modified timing message by:

using any nanosecond correction value stored in a PTP nanoseconds correction (correctionNs) field of the timing message and any sub-nanoseconds correction value stored in a PTP sub-nanoseconds correction (correctionSubNs) field of the timing message to correct the nanoseconds values of the timestamp thereby producing a corrected nanoseconds value for the timestamp;

inserting, into the PTP correctionNs field of the timing message, the four least significant bytes of the six-byte seconds value and two bytes of the four-byte nanoseconds value of the timestamp; and inserting, into the PTP correctionSubNs field of the timing message, the corrected nanoseconds values for the timestamp; and wherein the time synchronization application is configured to:

receive the modified timing message;

extract, from the PTP correctionNs field of the modified timing message, the four least significant bytes of the six-byte seconds value of the timestamp and the two bytes of the four-byte nanoseconds value;

extract, from the PTP correctionSubNs field of the modified timing message, the corrected nanoseconds value for the timestamp;
obtain the two most significant bytes for the six-byte seconds value from a local clock;
reconstruct the timestamp for the timing message from the two most significant bytes for the six-byte seconds value obtained from the local clock, the four least significant bytes of the six-byte seconds value and the two bytes of the four-byte nanoseconds value of the timestamp extracted from the PTP correctionNs field of the modified timing message, and the corrected nanoseconds value for the timestamp extracted from the PTP correctionSubNs field of the modified timing message thereby producing a reconstructed timestamp for the timing message; and
use the reconstructed timestamp for the timing message in implementing at least part of the packet-based synchronization protocol.

11. The first system of claim 1, wherein the first system comprises a node of a radio access network.

12. The first system of claim 1, wherein the first system comprises a first baseband unit (BBU) and the second system comprises at least one of a second BBU and a remote radio head (RRH).

13. The first system of claim 1, wherein the first system comprises a first Open RAN Alliance (O-RAN) distributed unit (DU) and the second system comprises at least one of a second O-RAN DU and an O-RAN remote unit (RU).

14. A method of using in-band signaling with a first system having a memory space in memory of the first system that is logically partitioned into a kernel space and a user space, the method used to communicate timestamp information from the kernel space of the memory space to the user space of the memory space, the method comprising, for a timing message received by a network interface of the first system, the timing message generated by a second system in accordance with a packet-based synchronization protocol and transmitted from the second system over a packet network to the first system:
in the kernel space of the memory space:
capturing a timestamp associated with a time the timing message was received by the network interface; and
modifying the timing message to include timing information associated with the time the timing message was received by the network interface thereby producing a modified timing message; and
in the user space of the memory space:
accessing the modified timing message; and
extracting the timing information included in the modified timing message for use in implementing at least a part of the packet-based synchronization protocol.

15. The method of claim 14, wherein the first system is configured to serve as a master timing entity for the packet-based synchronization protocol, and wherein the second system comprises a slave timing entity for the packet-based synchronization protocol.

16. The method of claim 14, wherein the first system is configured so that multiple second systems use the first system as a master timing entity for the packet-based synchronization protocol, each of the multiple second systems configured to serve as a respective slave timing entity for the packet-based synchronization protocol;
wherein the method is performed for timing messages received by the network interface from the multiple second systems, each timing message generated by a respective one of the multiple second systems in accordance with the packet-based synchronization protocol and transmitted from the respective second system over the packet network to the first system.

17. The method of claim 14, wherein the first system is configured to serve as a slave timing entity for the packet-based synchronization protocol, and wherein the second system comprises a master timing entity for the packet-based synchronization protocol.

18. The method of claim 14, further comprising reconstructing the timestamp for the timing message from the timing information extracted from the modified timing message to produce a reconstructed timestamp for the timing message and using the reconstructed timestamp for the timing message in implementing at least a part of the packet-based synchronization protocol.

19. The method of claim 18, wherein the packet-based synchronization protocol comprises a Precision Time Protocol (PTP), wherein the timestamp comprises:
a six-byte seconds value representing a number of seconds associated with the time the timing message was received by the network interface, the six-byte seconds value comprising a two most significant bytes and a four least significant bytes; and
a four-byte nanoseconds value representing a number of nanoseconds associated with the time the timing message was received by the network interface;
wherein modifying the timing message to include the timing information associated with the time the timing message was received by the network interface thereby producing the modified timing message comprises:
inserting, into a PTP nanoseconds correction (correctionNs) field of the timing message, the four least significant bytes of the six-byte seconds value and two bytes of the four-byte nanosecond value of the timestamp; and
inserting, into a PTP sub-nanoseconds correction (correctionSubNs) field of the timing message, two other bytes of the four-byte nanoseconds value of the timestamp; and
wherein extracting the timing information included in the modified timing message for use in implementing at least a part of the packet-based synchronization protocol comprises:
receiving the modified timing message;
extracting, from the PTP correctionNs field of the modified timing message, the four least significant bytes of the six-byte seconds value and the two bytes of the four-byte nanosecond value of the timestamp;
extracting, from the PTP correctionSubNs field of the modified timing message, the two other bytes of the four-byte nanoseconds value of the timestamp;
obtaining the two most significant bytes for the six-byte seconds value from a local clock;
reconstructing the timestamp for the timing message from the two most significant bytes for the six-byte seconds value obtained from the local clock, the extracted four least significant bytes of the six-byte seconds value of the modified timing message, and the extracted four-byte nanoseconds value of the modified timing message thereby producing a reconstructed timestamp for the timing message; and
using the reconstructed timestamp for the timing message in implementing at least part of the packet-based synchronization protocol.

20. The method of claim 18, wherein the packet-based synchronization protocol comprises a Precision Time Protocol (PTP), wherein the timestamp comprises:

a six-byte seconds value representing a number of seconds associated with the time the timing message was received by the network interface, the six-byte seconds value comprising a two most significant bytes and a four least significant bytes; and a four-byte nanoseconds value representing a number of nanoseconds associated with the time the timing message was received by the network interface;

wherein modifying the timing message to include the timing information associated with the time the timing message was received by the network interface thereby producing the modified timing message comprises:

using any nanosecond correction value stored in a PTP nanoseconds correction (correctionNs) field of the timing message and any sub-nanoseconds correction value stored in a PTP sub-nanoseconds correction (correctionSubNs) field of the timing message to correct the nanoseconds values of the timestamp thereby producing a corrected nanoseconds value for the timestamp;

inserting, into the PTP correctionNs field of the timing message, the four least significant bytes of the six-byte seconds value and two bytes of the four-byte nanoseconds value of the timestamp; and inserting, into the PTP correctionSubNs field of the timing message, the corrected nanoseconds values for the timestamp; and wherein extracting the timing information included in the modified timing message for use in implementing at least a part of the packet-based synchronization protocol comprises:

receiving the modified timing message;

extracting, from the PTP correctionNs field of the modified timing message, the four least significant bytes of the six-byte seconds value and the two bytes of the four-byte nanoseconds value of the timestamp;

extracting, from the PTP correctionSubNs field of the modified timing message, the corrected nanoseconds value for the timestamp;

obtaining the two most significant bytes for the six-byte seconds value from a local clock;

reconstructing the timestamp for the timing message from the two most significant bytes for the six-byte seconds value obtained from the local clock, the four least significant bytes of the six-byte seconds value and the two bytes of the four-byte nanoseconds value of the timestamp extracted from the PTP correctionNs field of the modified timing message, and the corrected nanoseconds value for the timestamp extracted from the PTP correctionSubNs field of the modified timing message thereby producing a reconstructed timestamp for the timing message; and using the reconstructed timestamp for the timing message in implementing at least part of the packet-based synchronization protocol.

* * * * *